Figure 4:
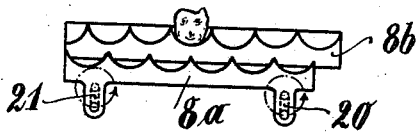
Figure 5:
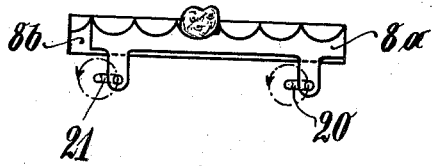
Figure 6:
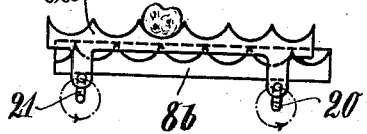

F. WIEGHARD & H. GÖBEL, Jr.
MACHINE FOR PLANTING POTATOES.
APPLICATION FILED DEC. 14, 1910.
1,028,411.
Patented June 4, 1912.
2 SHEETS—SHEET 1.
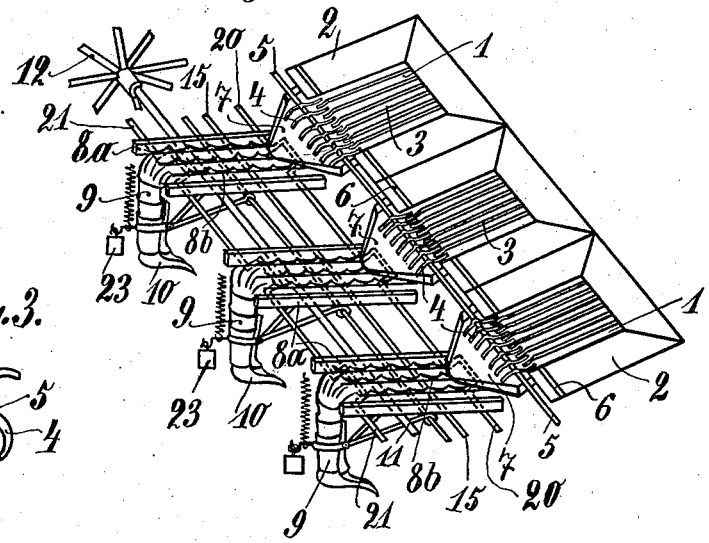
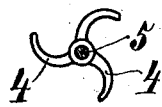
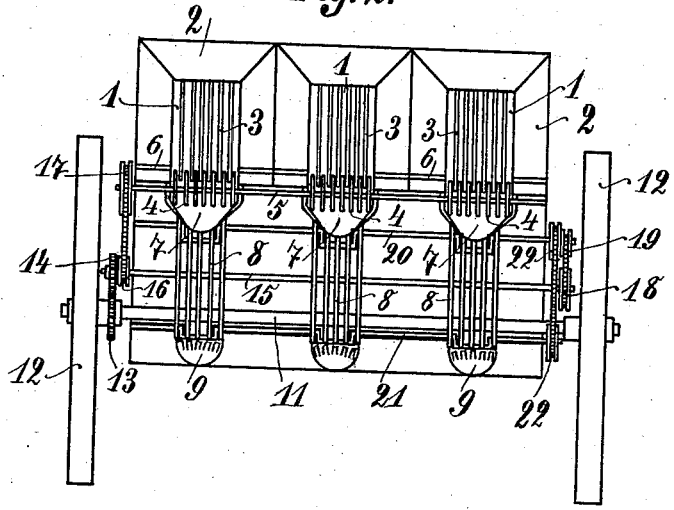
Witnesses:
Inventors:

UNITED STATES PATENT OFFICE.

FRITZ WIEGHARD AND HEINRICH GÖBEL, JR., OF HEIMBURG, GERMANY.

MACHINE FOR PLANTING POTATOES.

1,028,411.  Specification of Letters Patent.  Patented June 4, 1912.

Application filed December 14, 1910. Serial No. 597,218.

*To all whom it may concern:*

Be it known that we, FRITZ WIEGHARD and HEINRICH GÖBEL, Jr., subjects of the Duke of Brunswick, and residents of Heimburg, Germany, have invented certain new and useful Improvements in Machines for Planting Potatoes, of which the following is a specification.

This invention relates to an improved machine for planting potatoes, in which the potatoes coming from a container are by a shaft provided with wings singly thrown on a conveyer from which they are gradually supplied to seed ducts delivering them into the ground, so that damage to the potatoes is almost impossible.

The accompanying drawing shows the improved machine.

Figure 1 is a perspective view, Fig. 2 a plan view, of the same, while Fig. 3 shows a modified form of the shaft. Figs. 4 to 7 show the conveyance of the potatoes in four consecutive periods, and Fig. 8 shows a plan view of the conveyer shown in Fig. 7.

The machine shown on the drawing comprises three sections, though of course more or less sections can be used. The containers are assembled in a common casing or hopper, which is portable on wheels and adapted to be drawn by horses or cows.

The containers 1 are provided with inclined side walls 2 and with a gratelike bottom 3. Between each two bars of the grate 3 projects a wing 4, said wings being fixed on a common shaft 5. The wings may be two-parted for potatoes of medium size, or three-parted (Fig. 3) for large potatoes and they are interchangeable, the shape of the wing parts being curved to prevent damage to the potatoes. In the side walls of the containers a slot 6 is provided which serves for the reception of a shut-off slide if it is desired to stop the supply of potatoes.

The potatoes caught by the wings 4 are thrown onto an inclined plane 7 which is arranged beneath the shaft 5 and over which the potatoes are led onto the conveyer, which is designed to conduct the potatoes one by one into the seed ducts 9, which are located behind the furrow opening share 10, so that the potatoes are placed into the furrow directly behind the share making the same.

The conveyer comprises a number of conveying ledges 8ª, of which for each potato row preferably three are provided, which are loosely mounted at some distances from each other on the crank shafts 20 and 21. At the upper edges said ledges are provided with depressions which serve for the reception of one potato at a time. Three movable ledges 8ª pass between the fixed ledges 8ᵇ (Fig. 8). The two middle ones of the latter are also provided with a number of depressions, while the side walls are shaped flat and without depressions in order to prevent the potatoes from falling out.

Figure 7:
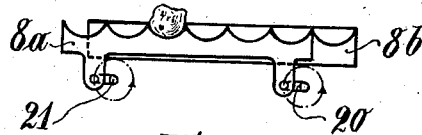
Figure 8:
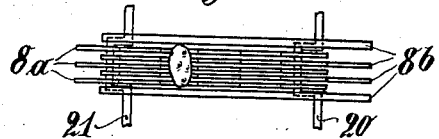

Figs. 4 to 7 show the mode of conveying the potatoes. For sake of clearness only one potato is shown on the conveyer, though in fact each depression contains one. The ledges 8ª assume first the position shown in Fig. 4. Upon turning the crank shafts 20 and 21 the ledges are moved into the position shown in Fig. 5, in which the depressions in the ledges 8ª and 8ᵇ coincide with each other. Upon further turning the crank shafts, the potato is lifted by the movable ledges from the fixed ledges (Fig. 6) and upon the succeeding down movement placed into the next following depression of the ledges 8ᵇ (Fig. 7). In this way, the potatoes lying on the ledges are by each turn of the crank shafts advanced from one depression to another until they are supplied to the seed ducts at the ends of the ledges 8ᵇ.

On the left rear hub of the axle 11 for the road wheel 12 a toothed wheel 13 is fixed, which gears with a spur wheel 14 on the shaft 15. Beside the spur wheel 14 a chain wheel 16 is arranged, which by a chain is in communication with a chain wheel 17 on the shaft 5, whereby the latter is driven together with its wings. The two toothed wheels 13 and 14 must be interchangeable in order to change the speed of the shaft 5 according to the desired distances at which the potatoes are to be planted.

On the right side of the machine, the axle 15 carries a chain wheel 18 which by a chain is in communication with a chain wheel 19 on the crank shaft 20 to which the conveying ledges 8ª are attached in any appropriate way. The crank shaft 20 is by a chain gearing 22 in communication with the crank shaft 21.

Before using the machine, the ground must be plowed and dragged, in order to allow the furrow shares 10 to penetrate the ground deep enough and to plant thus the potatoes at a uniform depth. To control said depth, weights 23 or springs are located behind the seed ducts. Upon the potatoes being planted, it is only necessary to drag the ground once more to cover the potatoes with earth.

Preferably, the machine must be also fitted with a disengaging device of known type for the driving mechanism, further with a device for raising the shares and seed ducts, in case the machine is not in use. Finally, means may be provided to adjust the potato container in order to impart to it an inclined position corresponding to the ground.

We claim:

In a machine for planting potatoes, comprising containers and seed ducts, conveyers to bring the potatoes from their containers one by one into the seed ducts, comprising in combination ledges arranged side by side and at the top provided with depressions, means to impart to each second one of said ledges a forwardly and upwardly directed movement, the other ledges being fixed, and means to feed the potatoes onto said ledges, for the purpose set forth.

In testimony whereof we have hereunto set our hands in the presence of two subscribing witnesses.

FRITZ WIEGHARD.
HEINRICH GÖBEL, Jr.

Witnesses:
Frau LANGE,
EMILIE ZIKMUND.

Copies of this patent may be obtained for five cents each, by addressing the "Commissioner of Patents, Washington, D. C."